United States Patent [19]

Jesurum

[11] Patent Number: 4,742,537
[45] Date of Patent: May 3, 1988

[54] TELEPHONE LINE MONITORING SYSTEM

[75] Inventor: Robert Jesurum, Stamford, Conn.

[73] Assignee: Electronic Information Systems, Inc., Stamford, Conn.

[21] Appl. No.: 870,506

[22] Filed: Jun. 4, 1986

[51] Int. Cl.[4] .................. H04M 1/24; H04M 1/26
[52] U.S. Cl. .......................... 379/351; 381/42
[58] Field of Search ............... 379/386, 41, 48, 51, 379/80; 381/42, 46

[56] References Cited

U.S. PATENT DOCUMENTS

| | | | |
|---|---|---|---|
| 3,873,772 | 3/1975 | Dumler | 381/46 |
| 3,881,061 | 4/1975 | Ando | 379/80 |
| 3,985,956 | 10/1976 | Monti et al. | 381/46 |
| 4,061,878 | 12/1977 | Adoul et al. | 381/46 |
| 4,296,277 | 10/1981 | Daneffel | 379/80 |
| 4,297,533 | 10/1981 | Gander et al. | 381/46 |
| 4,356,348 | 10/1982 | Smith | 179/1 MN |
| 4,439,639 | 3/1984 | Munter | 379/386 |
| 4,534,041 | 8/1985 | Münter | 375/94 |
| 4,667,065 | 5/1987 | Bangerter | 379/351 |

Primary Examiner—Stafford D. Schreyer
Attorney, Agent, or Firm—Kenyon & Kenyon

[57] ABSTRACT

A device for detecting voice signals in the presence of supervisory signals on a number of telephone lines so as to determine when machine-placed telephone calls have been answered. The device comprises a zero crossing detector for each telephone line monitored to determine the zero voltage crossings in the voltage of an incoming telephone signal, a latch associated with each detector for storing the occurrences of each zero voltage crossing detected and a microcomputer for processing the frequency-related information of the incoming telephone signals according to a voice detection algorithm. The voice detection algorithm comprises timer interrupt and analysis routines that direct the microcomputer to count the number of occurrences of different wavelengths of the waveforms composing an incoming telephone signal in determining the condition of response on a respective telephone line.

24 Claims, 3 Drawing Sheets

TELEPHONE LINE MONITORING SYSTEM

TECHNICAL BACKGROUND

The invention relates generally to a circuit for the characterization of sound. In particular, the invention relates to a circuit to detect voice signals in the presence of supervisory signals on a number of telephone lines.

BACKGROUND OF THE INVENTION

When a machine-placed telephone call is made to a subscriber, such as is done by a telemarketing computer calling system, it is desirable to have the calling system designed to automatically determine when that call has been answered. This determination must be made within 50 milliseconds so that a waiting operator can be connected to the subscriber by the calling system without any perceivable delay.

Inasmuch as there are typically several seconds between normal ring signals used by the telephone switching network, it is not possible to determine the called party pickup by detecting loss of ring voltage. Furthermore, it is not uncommon to have the called party pickup prior to the initiation of ring signaling as received by the calling system, since ring signals heard by the called party may not be generated by the same signal source that generates ring signals to the calling system. For these reasons, it is apparent that a means of detecting voice is desirable since it may be assumed that the called party will always respond verbally when answering the telephone.

Many of the techniques employed by present telephone line monitoring systems cannot detect or distinguish between voice and telephone tones in a fast and inexpensive manner. For instance, devices that detect and distinguish between voice and tone signals on the line through a reliance on the time delays exhibited by the type of signal are subject to error due to widely ranging variations in tone signals which may occur. Also, devices which employ pattern recognition techniques require a substantial amount of dedicated equipment and, thus, a substantial amount of cost.

U.S. Pat. No. 4,356,348 ("Smith") describes a device for detecting the condition of response of a telephone line by determining the most prevalent time interval between zero voltage crossovers of an input signal, comparing that interval with succeeding time intervals and classifying the input signal as periodic or not. The nature of the input signal is further analyzed to ascertain the condition on the telephone line. However, the mechanism used by the device to detect the response condition requires relatively long sampling periods of the input signal.

U.S. Pat. No. 4,405,833 ("Cave, et al.") describes a device for determining the status of a telephone call by measuring the periods of the low frequency envelope cycles of an incoming signal and evaluating them to determine if the incoming signal comprises call progress tones or voice. Voice is indicated if the periods are not reasonably constant over a standard measurement interval. Analog techniques, such as is utilized by the device, are relatively expensive to implement.

SUMMARY OF THE INVENTION

The foregoing problems are obviated by the invention which is a circuit for characterizing a sound signal by sampling the electrical signal produced by an electroacoustic transducer, comprising:

(a) means for detecting the occurrence of each waveform composing a sampled electrical signal;

(b) means for measuring the wavelength of each waveform detected;

(c) means for counting the number of waveforms within each of a plurality of predetermined wavelength groupings; and (d) means for characterizing the sound signal based on the counts of waveforms within the plurality of predetermined wavelength groupings and the distribution thereof.

The invention takes short snapshots of an incoming signal (e.g. samples with a duration of 10 milliseconds) and keeps count of the number of occurrences of different wavelengths of the waveforms composing the incoming signal within a selected number of ranges. This method of sampling resembles the behavior of neurons of the human ear. For a given sample, voice will generate occurrences in a greater number of ranges than will tones because voice sounds exhibit more complex waveforms than tones which are composed of one or more of a few simple frequencies. For reliability, and to avoid an erroneous interpretation of noise, the invention can take two or three samples in succession such that the same successive interpretation will cause a response by the invention that distinguishes between silence, tones and voice on a telephone line.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
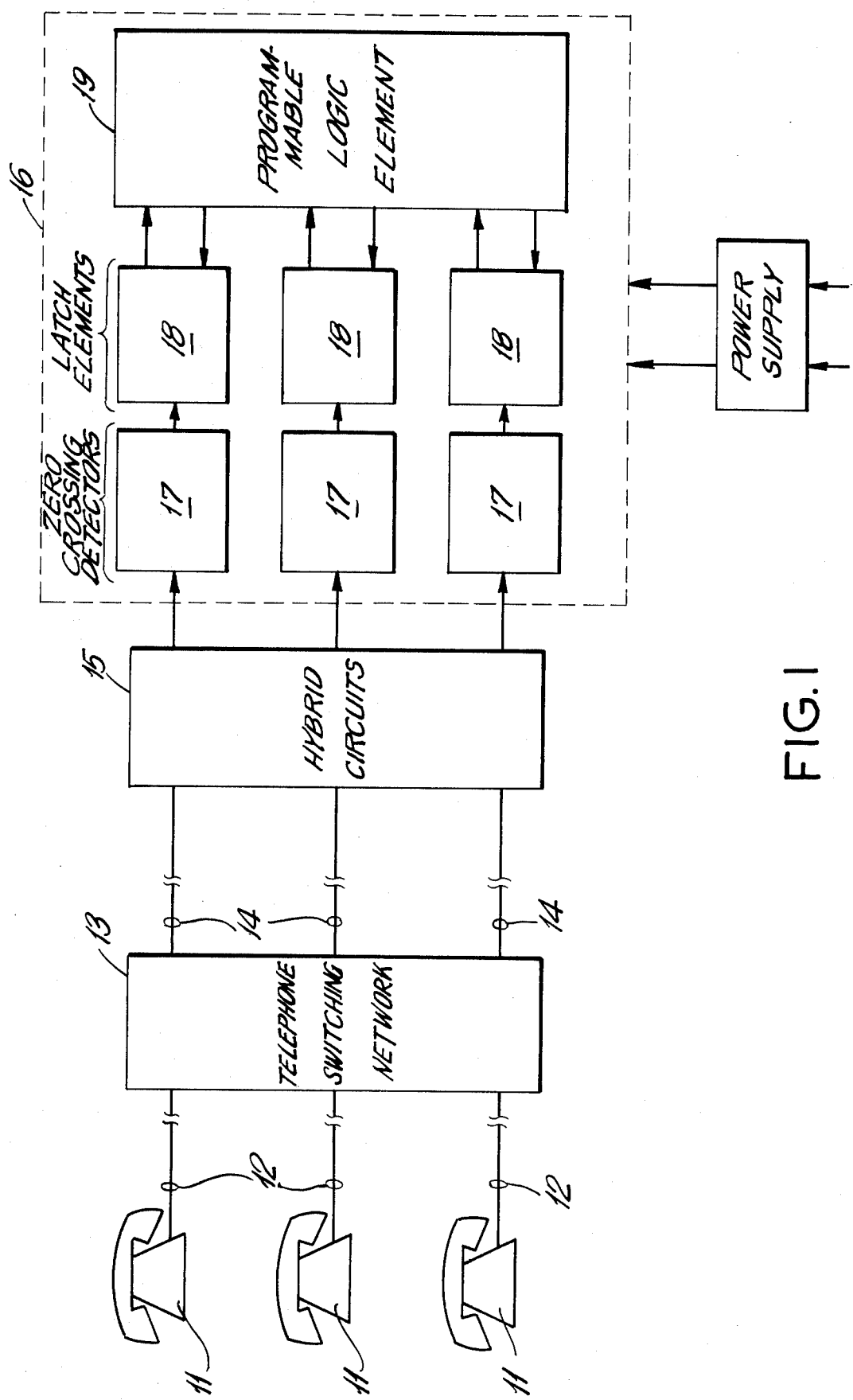
FIG. 1 is a block diagram of a voice detection system of the present invention.

As shown in FIG. 1, a plurality of subscriber telephone sets 11 are connected by cables 12 to a telephone switching network 13. The switching network 13, in turn, connects the sets 11, via respective telephone lines 14, to a plurality of hybrid circuits 15 of a telephone calling system (not shown). The hybrid circuits 15 interface the telephone switching network 13 with a voice detection system 16, which may form part of the telephone calling system, and separate incoming and outgoing signals that appear on the connected telephone lines 14. In this manner, only incoming signals will be applied to the voice detection system 16.

The voice detection system 16 comprises a plurality of zero crossing detectors 17, a plurality of latch elements 18 and a programmable logic element 19. Note that a power supply feeds the appropriate elements of the system 16. Each zero crossing detector 17 is tied to a respective telephone line 14 and detects when the incoming signal voltage on the telephone line 14 changes from a negative voltage to a positive voltage. The zero crossing detector 17 can detect when the incoming signal voltage changes from a positive voltage to a negative voltage since identical information would be obtained. For each so-called zero voltage crossing of the incoming signal voltage (i.e., for whichever polarity change is selected to be utilized), a voltage pulse is transmitted by the detector 17 to an associated latch element 18. At each of these zero voltage crossings, the length of the waveform of the incoming signal from the time of the previous crossing is measured by the logic element 19.

The latch elements 18 each comprise an input to receive the voltage pulses from the associated detector 17 and an output to produce a latched logic "1" in response thereto, thus storing the zero voltage crossing events. The programmable logic element 19, which may be a microprocessor or microcomputer, samples the output contents of the latch elements 18 and processes the frequency-related information for the respective incoming signals gathered by the system 16 according to a voice detection algorithm described below. The results of the information processing (i.e., determination of voice, call progress tones, silence, etc.) are passed on to the telephone calling system for further appropriate action.

In operation, the telephone calling system, of which the voice detection system 16 may be part, places telephone calls to a number of subscriber sets 11. The respective telephone lines 14 to the switching network 13 are then connected to the hybrid circuits 15 of the calling system. The hybrid circuits 15 pass only the incoming signals of the telephone lines 14 to the zero crossing detectors 17 of the voice detection system 16, each detector 17 being assigned to monitor one telephone line 14.

The incoming signal of each telephone line 14 may be composed of any number of waveforms of various wavelengths depending upon the condition of response on the telephone line 14 (i.e., silence, tones, voice, etc.). Each zero crossing detector 17 monitors the incoming signal of the assigned telephone line 14 and outputs a voltage pulse each time the incoming signal voltage changes from a negative to a positive polarity. Therefore, the detector 17 will not output a voltage pulse if silence is on the telephone line 14 and will output many voltage pulses if call progress tones or voice are on the line 14.

Each latch element 18 receives the output of a respective detector 17 and outputs a latched logic "1" upon receiving a voltage pulse. The logic element 19, which checks the output contents of the latch elements 18 simultaneously, is thus presented with a number of logic "1"'s equal to the number of telephone lines 14 that carry incoming signals. Upon recognizing that a zero voltage crossing has occurred for an incoming signal, the logic element 19 will issue a reset signal to the respective latch element 18 to prepare it for the next zero voltage crossing of the incoming signal.

Figure 2:
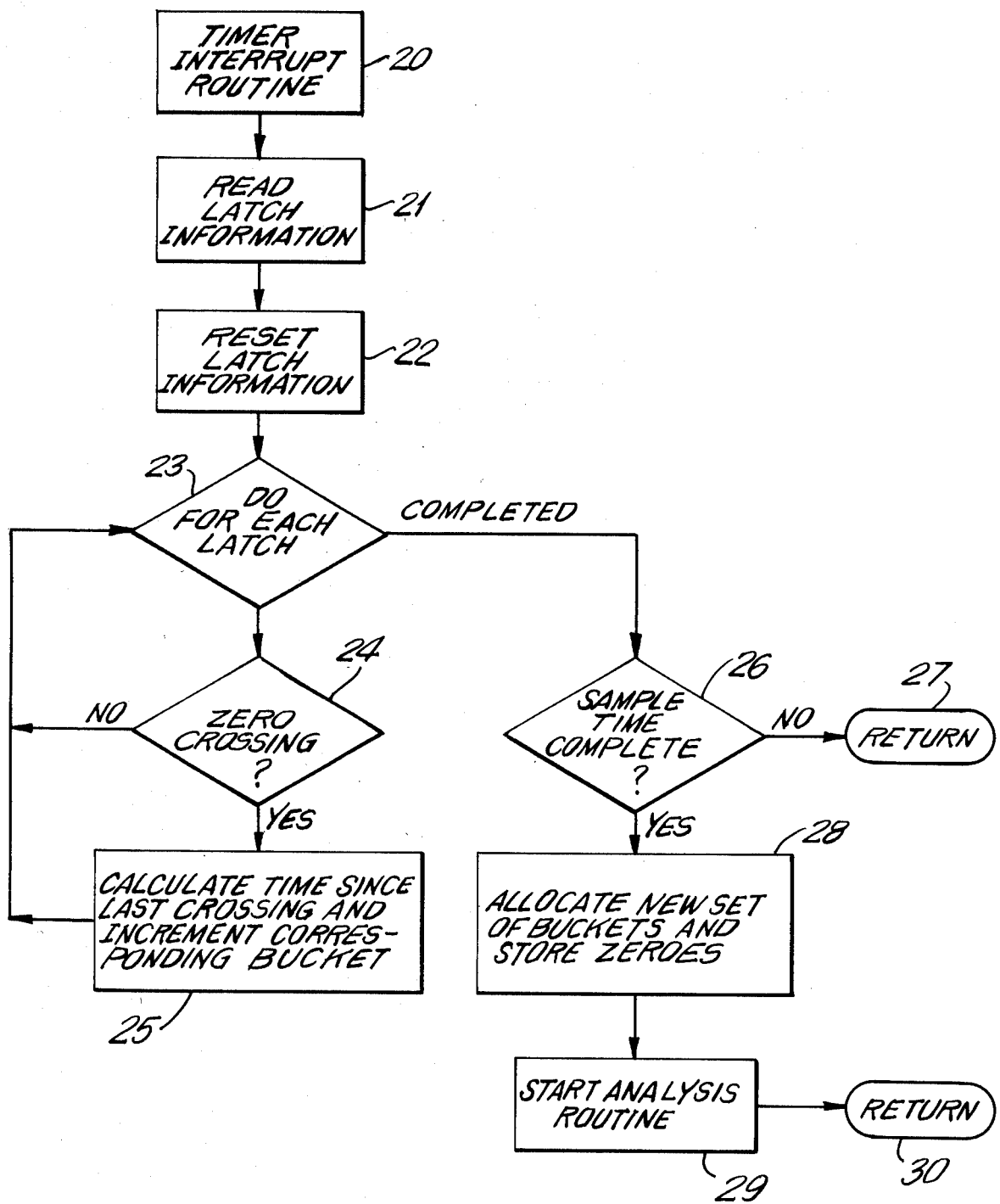
FIG. 2 is a flow chart of a timer interrupt software program used by the voice detection system of FIG. 1.

FIG. 2 shows a flow chart of a timer interrupt software program which is utilized by the logic element 19 to sample the incoming signals on the telephone lines 14. The logic element 19 comprises a timer (not shown) which generates timer interrupts at a predetermined frequency (e.g., 3,000 hertz). The timer interrupts, which are set to be the highest priority interrupt for the logic element 19, prompt the timer interrupt routine (rectangle 20) to instruct the logic element 19 to read the output of the latch elements 18 (rectangle 21) and then to reset the latch elements 18 for the next zero voltage crossings of the respective incoming signals (rectangle 22).

For each latch element 18 utilized by the system 16 (diamond 23), the logic element 19 then tests if a zero voltage crossing event is stored therein (diamond 24). For those latch elements 18 that did not produce a latched logic "1" output, the logic element 19 goes on to test the next latch element 18 (diamond 23). For those latch elements 18 that produced a latched logic "1" output, the logic element 19 measures the elapsed time since the last crossing event by counting the number of interrupts between crossing events (rectangle 25). Counting the number of timer interrupts since the last zero voltage crossing permits the timing of incoming signal waveforms on a line 14 with a frequency greater than or equal to that of the timer (e.g., 3,000; 1,500; 1,000; 750; 600; 500; 429; 375; etc.). Finer gradations can be achieved by using a faster timer. Using the timing of the waveforms, the logic element 19 derives and establishes a registry of the wavelengths of the waveforms that compose the incoming signal on a line 14. As the crossing events are detected, the logic element 19 increments the count in the particular wavelength slots, or buckets, corresponding to the measured times between crossing events (rectangle 25). At the end of this operation, the next latch element 18 is tested in the same manner (diamond 23).

At the completion of testing of all the latch elements 18, the logic element 19 determines if the sampling time for the incoming signals (i.e., 10 milliseconds) has elapsed (diamond 26). If it hasn't, the logic element 19 returns to whatever task it was performing before the timer interrupt occurred (e.g. number-crunching, idling, etc). (oval 27). If it has elapsed, the logic element 19 stores the wavelength bucket information and initializes a new set of wavelength buckets for the next sampling period (rectangle 28). Next, the timer interrupt routine starts up an analysis routine to interpret the data collected during the sampling period (rectangle 29). The analysis routine, which is triggered by a second timer at, for example, 100 hertz, runs as a background task with respect to the timer interrupt routine, allowing the next samples to be stored without interference. When the analysis routine has completed its evaluation of the data, the logic element 19 again returns to whatever task it was performing before the timer interrupt occurred (oval 30).

Figure 3:
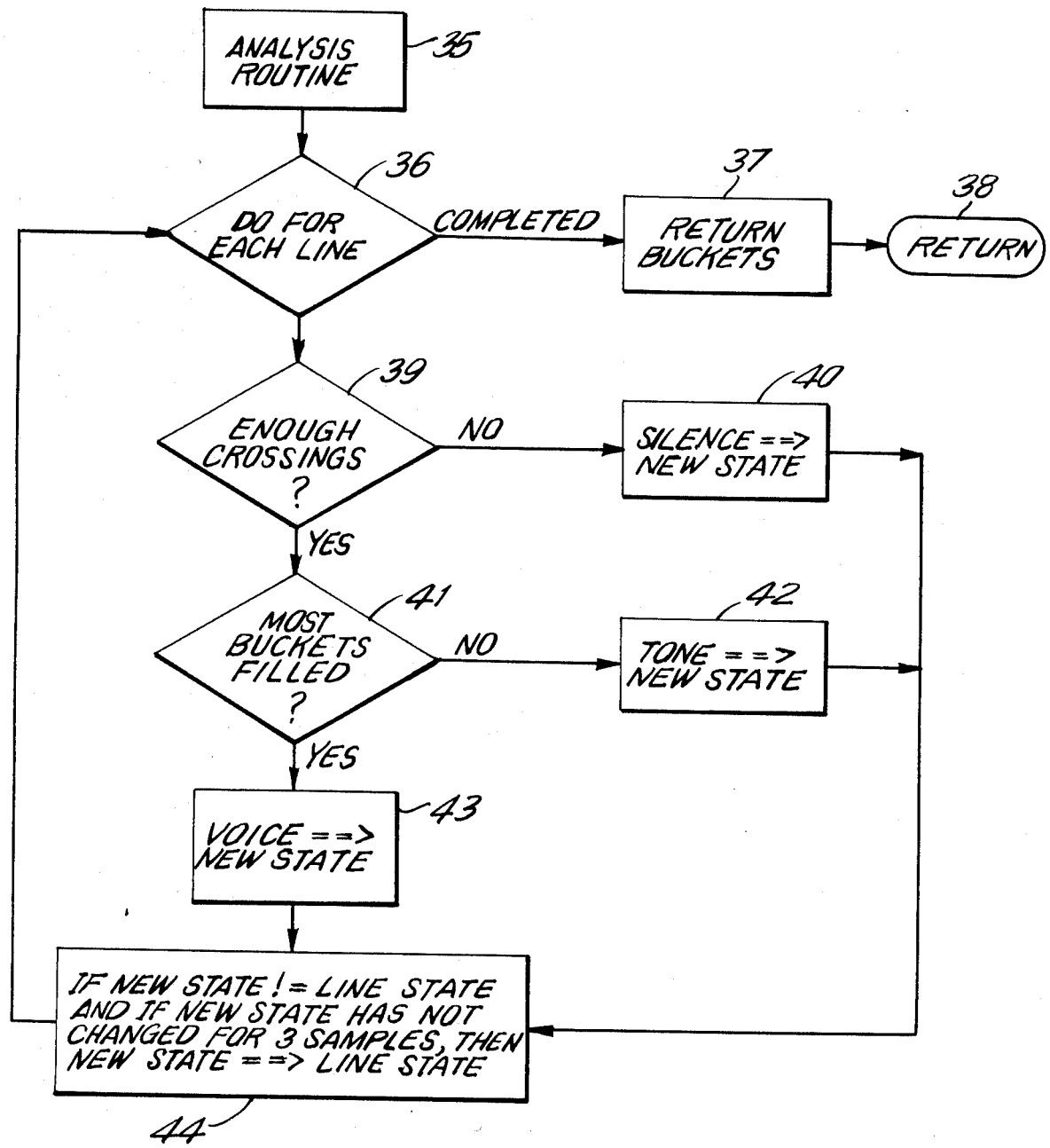
FIG. 3 is a flow chart of an analysis routine software program used by the voice detection system of FIG. 1.

FIG. 3 shows a flow chart for the analysis routine software program that is utilized by the logic element 19 to determine the condition of response on the telephone lines 14. The analysis routine (rectangle 35) is run for each of the telephone lines 14 being monitored, and, therefore, for each associated latch element 18 (diamond 36). As mentioned above, when the analysis routine has completed its evaluation of the data for each monitored telephone line 14, the wavelength buckets used by the logic element 19 are returned to free storage (rectangle 37) and the logic element 19 returns to its pre-timer interrupt task (oval 38).

The identical analysis is run by the analysis routine for the incoming signal of each telephone line 14 monitored. First, the logic element 19 determines if the total number of zero voltage crossings detected is below a predetermined threshhold limit (diamond 39). If the number is below the limit, then a temporary line state in the logic element 19 is interpreted as "silence" (rectangle 40). If a sufficient number of crossing exists, then the logic element 19 tests whether the incoming signal has a predetermined amount of wavelength buckets within a selected number of ranges (diamond 41). The ranges of wavelengths are derived from the frequency range of 428 to 3,000 hertz. If that amount of buckets are not "filled", i.e., do not have counts of zero voltage crossings, then the temporary line state is interpreted as "tone" (rectangle 42). If a sufficient amount of buckets are filled, then the temporary line state is interpreted as "voice" (rectangle 43). In a sense, the logic element 19 compares the stored wavelength bucket registry of the incoming signal with a model registry of an incoming signal composed of tones and proceeds accordingly.

Next, the logic element 19 compares the temporary line state with a current line state (rectangle 44). For the first sampling of a monitored telephone line 14, the current line state will be initially empty indicating no interpretation of the incoming signal. However, at the end of the first sampling, the logic element 19 will replace the contents of the current line state with the contents of the temporary line state. During the next sampling, a comparison can then be made between the two line states. If the temporary line state is different from the current line state and if the temporary line state has remained the same, for example, for three samples (i.e., 30 milliseconds), then the current line state will be changed to reflect the new state, i.e., the contents of the temporary line state replace the contents of the current line state (rectangle 44).

Upon the change to the new line state, the logic element 19 then examines the contents of the current line state. If the new line state is determined to be voice, this signals that the telephone line 14 has been answered and the logic element 19 can direct that other equipment of the calling system attached to the voice detection system 16 can respond accordingly. If the new line state has changed from silence to tone or from tone to silence, the logic element 19 can direct that the length of the previous interval be timed for decisions about ring or busy tones. When the analysis routine has completed the evaluation for a telephone line 14, the logic element 19 returns to the start of the routine (diamond 36).

As mentioned previously, finer gradations of sampling may be achieved by using a faster timer. "Polling" each zero-crossing detector 17 at a 3,000 hertz rate is based on the need to sample several detectors 17 with a single logic element 19 and the slow upper limit of frequencies of interest. In applications in which it is desired to sample for many discrete frequencies, or for higher frequencies, the necessity of a higher polling rate would change the economics of the application. For such an application, it is preferable to cause an interrupt with each zero voltage crossing and to measure the precise elapsed time from the last interrupt-zero voltage crossing. This technique can be used to cheaply fill as many wavelength buckets of so many discrete frequencies as were of interest, or alternatively, to allocate buckets of discrete frequencies as each new frequency range was experienced.

The embodiment described herein is merely illustrative of the principles of the present invention. Various modifications may be made thereto by persons skilled in the art without departing from the spirit or scope of the invention.

For example, although the above embodiment has an objective that requires only a crude distinction of frequency ranges, there is no limit to the number of frequency range buckets that can be filled for a finer analysis of sounds, not only for the analysis of voice, but also of speech or of music. The above embodiment also has no interest in capturing amplitude information of an incoming signal, but the invention can be modified to capture wave amplitudes as well as wavelengths.

Further, the invention can be used to sample and characterize sounds which do not originate within telephone or transmission lines. Ultrasonic generators for liquid atomization and flame hydrolysis torches for lightguide manufacture are examples of sound-generating devices which can be "fine-tuned" by using the invention to sample and characterize the sound signals generated by each.

What is claimed is:

1. A circuit for characterizing a sound signal by sampling the electrical signal produced by an electroacoustic transducer, comprising:
    (a) means for detecting the occurrence of each waveform composing a sampled electrical signal;
    (b) means for measuring the wavelength of each waveform detected;
    (c) means for counting the number of waveforms within each of a plurality of predetermined wavelength groupings; and
    (d) means for characterizing the sound signal based on the counts of waveforms within the plurality of predetermined wavelength groupings and the distribution thereof.

2. The circuit of claim 1, wherein: the means for detecting the occurrence of each waveform comprises means for detecting each zero voltage crossing of the voltage of the sampled electrical signal.

3. The circuit of claim 1, wherein: the means for detecting the occurrence of each waveform comprises means for detecting a particular polarity change of the voltage of the sampled electrical signal over a selected interval.

4. The circuit of claim 2, wherein: the means for measuring comprises means for measuring the wavelength of each waveform between each zero voltage crossing detected.

5. The circuit of claim 3, wherein: the means for measuring comprises means for measuring the wavelength of each waveform between each polarity change detected of the voltage of the sampled electrical signal.

6. A transmission line monitoring system for determining the condition of response of incoming signals on a plurality of transmission lines, comprising:
    (a) means for detecting a particular polarity change of the voltage of the incoming signal over a selected interval on each transmission line;
    (b) means for measuring the wavelength of each waveform composing a respective incoming signal between each polarity change detected;
    (c) means for counting the number of waveforms composing a respective incoming signal within each of a plurality of predetermined wavelength groupings; and
    (d) means for processing the frequency-related information of the incoming signals from the means for detecting, the means for measuring and the means for counting to determine the condition of response on each of the transmission lines.

7. The system of claim 6, wherein: the means for detecting comprises means for detecting each polarity change of the voltage from negative to positive of the incoming signal on each transmission line and the means for measuring comprises means for measuring the wavelength of each waveform between each polarity change detected of the voltage from negative to positive.

8. The system of claim 6, wherein: the means for processing comprises means for determining whether the particular allocation of waveforms composing a respective incoming signal in each of the wavelength groupings is sufficient so as to indicate that the respective incoming signal comprises a voice signal.

9. The system of claim 8, wherein: the plurality of predetermined wavelength groupings comprises groupings derived from a plurality of frequency ranges between 428 and 3000 hertz.

10. The system of claim 6, further comprising:
(a) means for storing the detection of each polarity change of the voltage of the incoming signal on each transmission line; and
(b) means for sampling the means for storing so as to activate the means for processing for all the transmission lines and to activate the means for measuring and the means for counting for those transmission lines for which a polarity change has been detected.

11. The system of claim 10, wherein: the means for processing comprises means for determining whether the particular allocation of waveforms composing a respective incoming signal in each of the wavelength groupings is sufficient so as to indicate that the respective incoming signal comprises a voice signal.

12. The system of claim 11, wherein: the plurality of predetermined wavelength groupings comprises groupings derived from a plurality of frequency ranges between 428 and 3000 hertz.

13. A telephone line monitoring system for determining the condition of response of incoming signals on a plurality of telephone lines, comprising:
(a) a plurality of detectors which each receives the incoming signal of a respective telephone line and outputs a voltage pulse upon a particular polarity change of the voltage of the incoming signal over a selected interval;
(b) a plurality of latch elements which each receive the output of a respective detector and stores the occurrence of a polarity change of the voltage of the respective incoming signal upon receiving a voltage pulse; and
(c) a programmable logic element which samples the stores of the latch elements and, in response thereto, processes the frequency-related information of each waveform composing a respective incoming signal between each polarity change detected in order to determine the condition of response on each of the telephone lines.

14. The system of claim 13, wherein: each particular polarity change of the voltage of an incoming signal comprises a polarity change of the voltage from negative to positive.

15. The system of claim 13, wherein: the logic element measures the wavelength of each wavefrom composing a respective incoming signal between each polarity change detected; counts the number of waveforms composing a respective incoming signal within each of a plurality of predetermined wavelength groupings; and determines, via the particular allocation of the waveforms in each of the groupings, whether the respective incoming signal comprises silence, tone or voice.

16. The system of claim 15, wherein: the plurality of predetermined wavelength groupings comprises groupings derived from a plurality of frequency ranges between 428 and 3,000 hertz.

17. The system of claim 13, further comprising: a timer which generates at a predetermined rate an interrupt signal to prompt the logic element to sample the stores of the plurality of latch elements.

18. The system of claim 15, further comprising: a timer that generates at a predetermined rate an interrupt signal to the logic element which, in response thereto, samples the stores of the plurality of latch elements and counts the number of interrupts since the last polarity change to measure the wavelength of a waveform composing a respective incoming signal.

19. The system of claim 13, further comprising: means for generating an interrupt signal upon the detection of a particular polarity change of the voltage a respective incoming signal to prompt the logic element to sample the stores of the plurality of latch elements.

20. The system of claim 15, further comprising: means for generating upon the detection of a particular polarity change of the voltage a respective incoming signal an interrupt signal to the logic element which, in response thereto, samples the stores of the plurality of latch elements and measures the times since the last polarity change interrupt to measure the wavelength of a waveform composing a respective incoming signal.

21. A method for characterizing a sound signal by sampling the electrical signal produced by an electroacoustic transducer, comprising the steps of:
(a) detecting the occurrence of each waveform composing a sampled electrical signal;
(b) measuring the wavelength of each waveform detected;
(c) counting the number of waveforms within each of a plurality of predetermined wavelength groupings; and
(d) characterizing the sound signal based on the counts of waveforms within the plurality of predetermined wavelength the groupings and the distribution thereof.

22. The method of claim 21, further comprising the step of:
(e) sampling the electrical signal repeatedly until the sound signal is characterized in the same fashion a predetermined successive number of times.

23. The method of claim 22, wherein: the time of sampling the electrical signal is 10 milliseconds.

24. A method for determining the condition of response of an incoming signal on a transmission line, comprising the steps of:
(a) detecting a particular polarity change of the voltage of the incoming signal over a selected interval on the transmission line so as to determine if there are a sufficient number of polarity changes in the incoming signal to indicate that the transmission line is not silent;
(b) detecting the number of occurrences of waveforms composing the incoming signal within each of a plurality of predetermined wavelength groupings so as to determine if there are a sufficient number of occurrences in each of the groupings to indicate that the incoming signal comprises a voice signal rather than a tone signal; and
(c) repeating steps (a) and (b) until the same condition of response is indicated a predetermined successive number of times.

* * * * *

UNITED STATES PATENT AND TRADEMARK OFFICE
CERTIFICATE OF CORRECTION

PATENT NO. : 4,742,537

DATED : May 3, 1988

INVENTOR(S) : Robert Jesurum

It is certified that error appears in the above-identified patent and that said Letters Patent is hereby corrected as shown below:

```
Column 2, line 16, change "count" to --counts--;
Column 3, line 50, change ""1"'s" to --"1"'s--;
Column 3, line 65, change "output" to --outputs--;
Column 4, line 65, change "crossing" to --crossings--;
Column 7, line 40, change "which each receive" to --each
                                   of which receives--;
Column 8, line 16, after "voltage", add --of--;
Column 8, line 21, after "voltage", add --of--;
Column 8, line 24, change "times" to --time--; and
Column 8, line 39, after "wavelength", delete --the--.
```

Signed and Sealed this

First Day of November, 1988

Attest:

DONALD J. QUIGG

*Attesting Officer*    *Commissioner of Patents and Trademarks*